US012715420B2

(12) United States Patent
Kostrzewski

(10) Patent No.: US 12,715,420 B2
(45) Date of Patent: Aug. 25, 2026

(54) SYSTEM AND METHOD FOR RANGE EXTENDED ELECTRIC VEHICLE

(71) Applicant: Ford Global Technologies, LLC, Dearborn, MI (US)

(72) Inventor: Thomas Jeremy Kostrzewski, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 451 days.

(21) Appl. No.: 18/316,947

(22) Filed: May 12, 2023

(65) Prior Publication Data

US 2024/0375634 A1 Nov. 14, 2024

(51) Int. Cl.

| | |
|---|---|
| ***B60W 20/10*** | (2016.01) |
| ***B60K 6/26*** | (2007.10) |
| ***B60K 6/365*** | (2007.10) |
| ***B60K 6/387*** | (2007.10) |
| ***B60K 6/46*** | (2007.10) |
| ***B60K 6/52*** | (2007.10) |
| ***B60W 10/02*** | (2006.01) |
| ***B60W 10/06*** | (2006.01) |
| ***B60W 10/08*** | (2006.01) |

(52) U.S. Cl.

CPC ............... *B60W 20/10* (2013.01); *B60K 6/26* (2013.01); *B60K 6/365* (2013.01); *B60K 6/387* (2013.01); *B60K 6/46* (2013.01); *B60K 6/52* (2013.01); *B60W 10/02* (2013.01); *B60W 10/06* (2013.01); *B60W 10/08* (2013.01); *B60K 2006/268* (2013.01); *B60W 2510/0208* (2013.01); *B60W 2510/1005* (2013.01); *B60W 2710/021* (2013.01); *B60W 2710/06* (2013.01); *B60W 2710/083* (2013.01); *B60Y 2200/92* (2013.01); *B60Y 2300/18033* (2013.01); *B60Y 2300/63* (2013.01); *B60Y 2300/91* (2013.01); *B60Y 2400/46* (2013.01); *B60Y 2400/73* (2013.01); *B60Y 2400/82* (2013.01)

(58) Field of Classification Search

CPC ...... B60W 20/10; B60W 10/02; B60W 10/06; B60W 10/08; B60W 2510/0208; B60W 2510/1005; B60W 2710/021; B60W 2710/06; B60W 2710/083; B60K 6/26; B60K 6/365; B60K 6/387; B60K 6/46; B60K 6/52; B60K 2006/268; B60Y 2200/92; B60Y 2300/18033; B60Y 2300/63; B60Y 2300/91; B60Y 2400/46; B60Y 2400/73; B60Y 2400/82

See application file for complete search history.

(56) References Cited

U.S. PATENT DOCUMENTS

| | | | |
|---|---|---|---|
| 8,425,377 | B2 | 4/2013 | Liang et al. |
| 9,187,087 | B2 | 11/2015 | Martin et al. |
| 9,297,447 | B2 | 3/2016 | Kim et al. |

(Continued)

FOREIGN PATENT DOCUMENTS

| | | |
|---|---|---|
| DE | 102014204966 A1 | 9/2014 |

*Primary Examiner* — James J Lee
*Assistant Examiner* — Steven Vu Nguyen
(74) *Attorney, Agent, or Firm* — McCoy Russell LLP

(57) ABSTRACT

Methods and systems for extending range and functionality of an electrified vehicle are described. In one example, a two-way clutch allows a vehicle to move in a forward or reverse direction under power of an electric machine. The electric machine may be operated as a generator and as a motor.

20 Claims, 8 Drawing Sheets

(56) References Cited

U.S. PATENT DOCUMENTS

| | | | | |
|---|---|---|---|---|
| 2004/0166980 | A1 | 8/2004 | Supina et al. | |
| 2007/0093341 | A1 | 4/2007 | Supina et al. | |
| 2014/0357441 | A1 | 12/2014 | Supina | |
| 2016/0369873 | A1* | 12/2016 | Chae | B60K 6/00 |
| 2017/0136867 | A1* | 5/2017 | Holmes | B60K 6/48 |
| 2020/0086848 | A1* | 3/2020 | Zhou | F16H 3/72 |

* cited by examiner

ROM
CPU
RAM
KAM
I/O
IGNITION SYSTEM
P
R
N
D
12
100
102
104
106
108
110
130
132
134
136
150
152
154
195
120
43
162
161
47
42
45
122
62
64
44
68
55
51
59
52
92
88
53
58
57
35
54
48
33
30
32
36
97
40
99
98
95
96
118
114
112
66
70
161
164
163
126
10

100
205
204
155
289
287
Diff. 236
Brakes 202
288
200
19
157
34
266
268
264
270
260
262
EM1 24
EM2 26
232
Ring 142
Sun 143
Ring 142
147
146
22
210
18
Battery 158
Controller 12
81 Actuators
16 Sensors
To Generator
10
30
66
203
202

202
203
10
30
66
210
146
22
Ring 142
Sun 143
Ring 142
147
232
EM1 24
18
260
157
100
300
205
204
155
262
250
251
288
287
Diff. 270
Battery 158
EM2 26
Diff. 236
Brakes 201
252
289
Controller 12
156
16 Sensors
81 Actuators

SYSTEM AND METHOD FOR RANGE EXTENDED ELECTRIC VEHICLE

FIELD

The present description relates generally to a system and method for extending range of an electrified vehicle.

BACKGROUND/SUMMARY

A vehicle may include a power split transmission that allows an engine to rotate at a speed that is different from a speed that an electric machine rotates. The power split transmission may include a mode where a first electric machine operates as a generator and a second electric machine operates as a propulsion motor. The engine may provide power to a same axle as the second electric machine so that the axle may be driven solely via the second electric machine, the engine, or the engine and the second electric machine. The engine may drive the first electric machine operating in a generator mode and the first electric machine may provide electric power to the second electric machine by consuming a portion of the engine's output. However, the first electric machine is limited to operating as only a generator so that it may not provide mechanical torque to the vehicle's wheels, which may constrain vehicle operation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
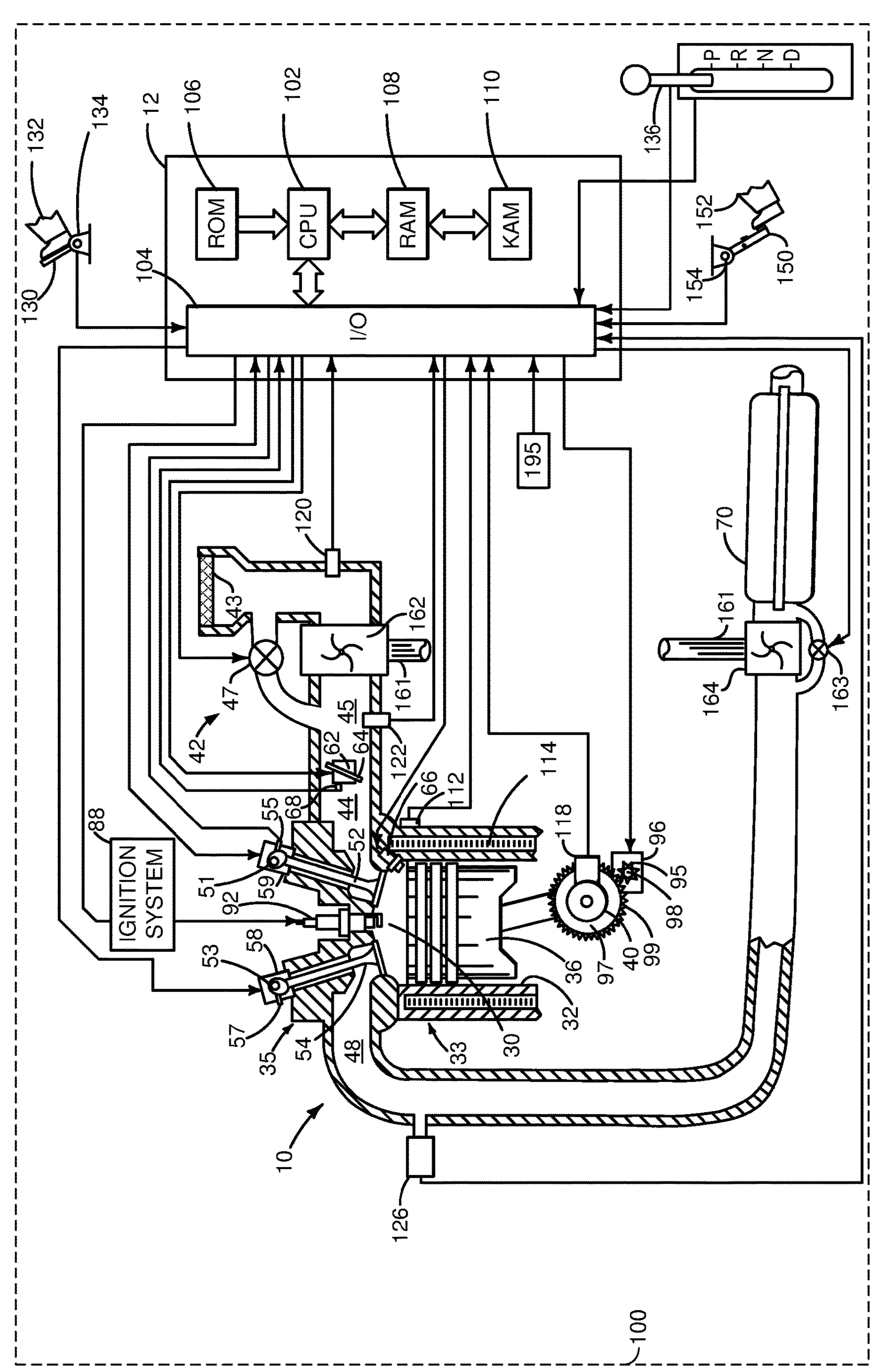
FIG. 1 is a schematic diagram of an engine system coupled in a hybrid vehicle system.
Figure 2:
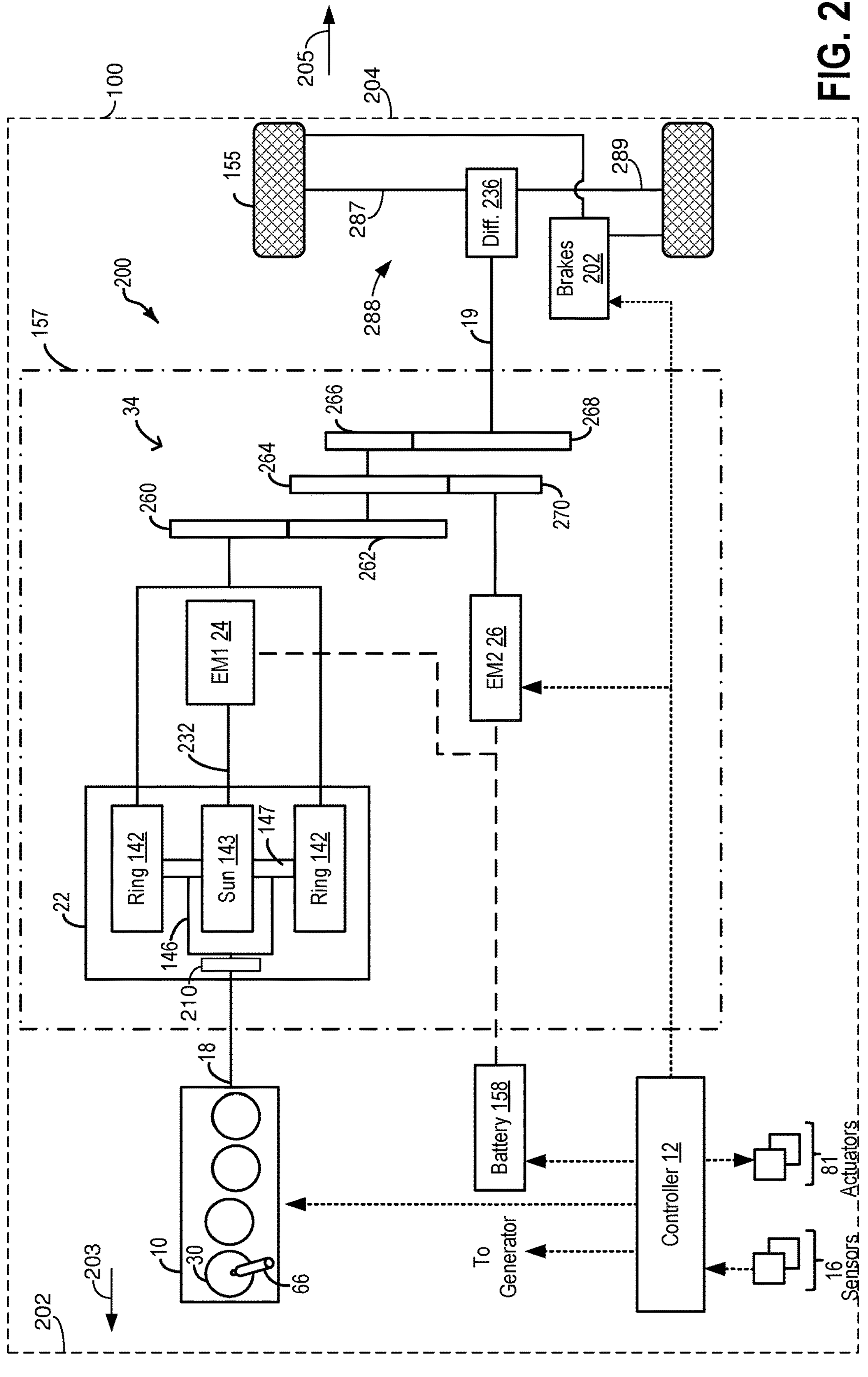
FIG. 2 shows an example powertrain of a first vehicle.
Figure 3:
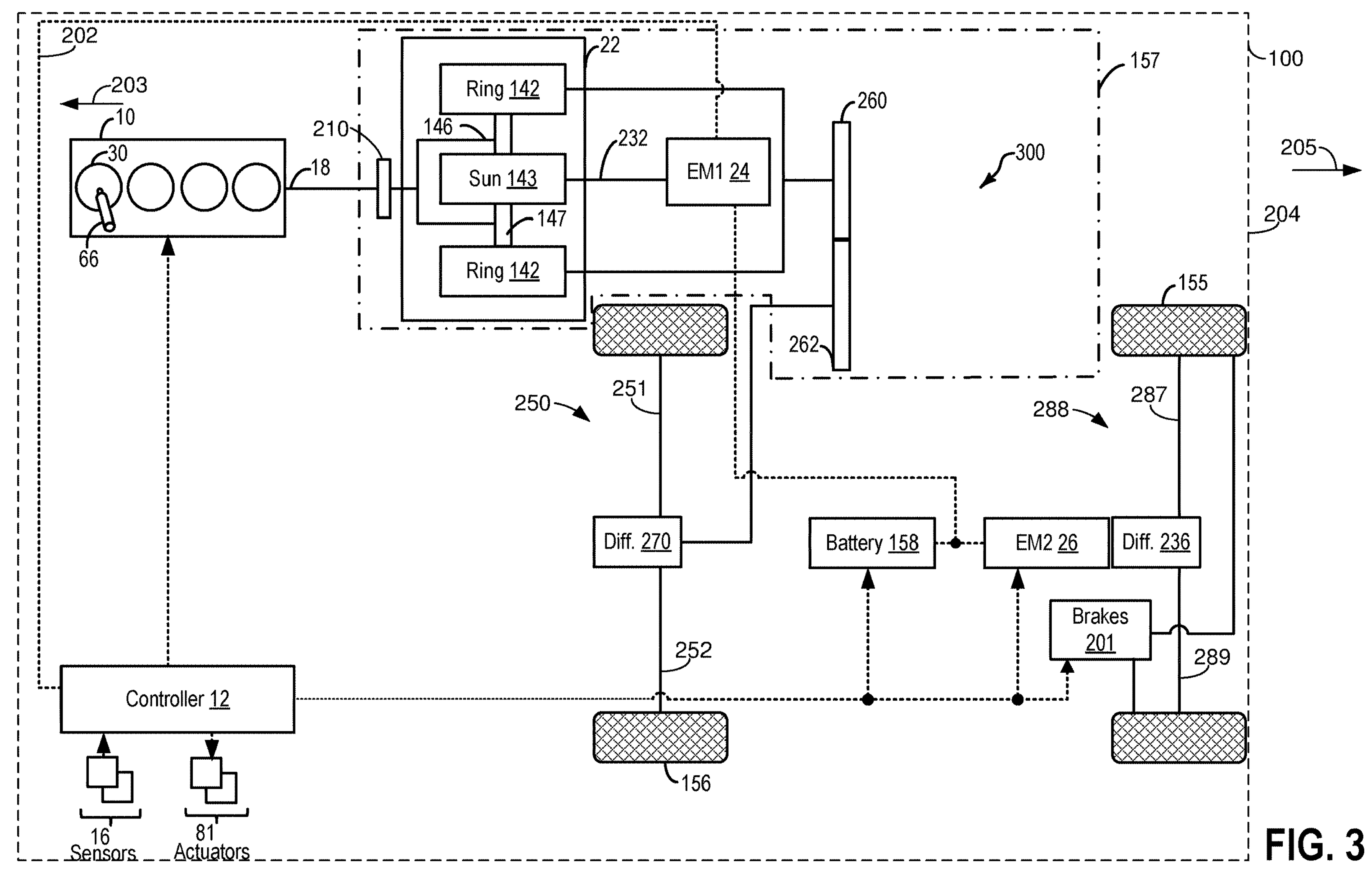
FIG. 3 shows an example powertrain of a second vehicle.
Figure 4:
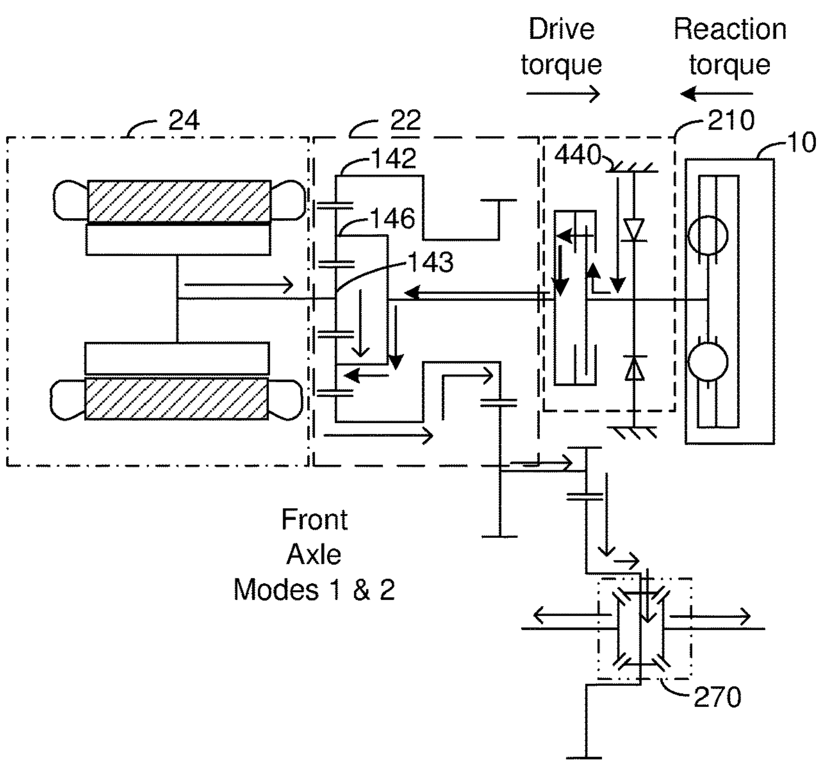
FIGS. 4-6 show operating modes for the second vehicle.
Figure 4:
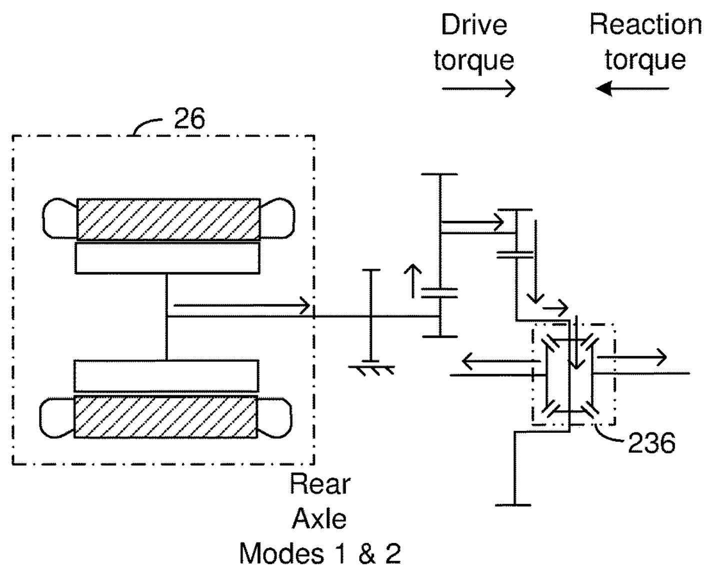
Figure 5:
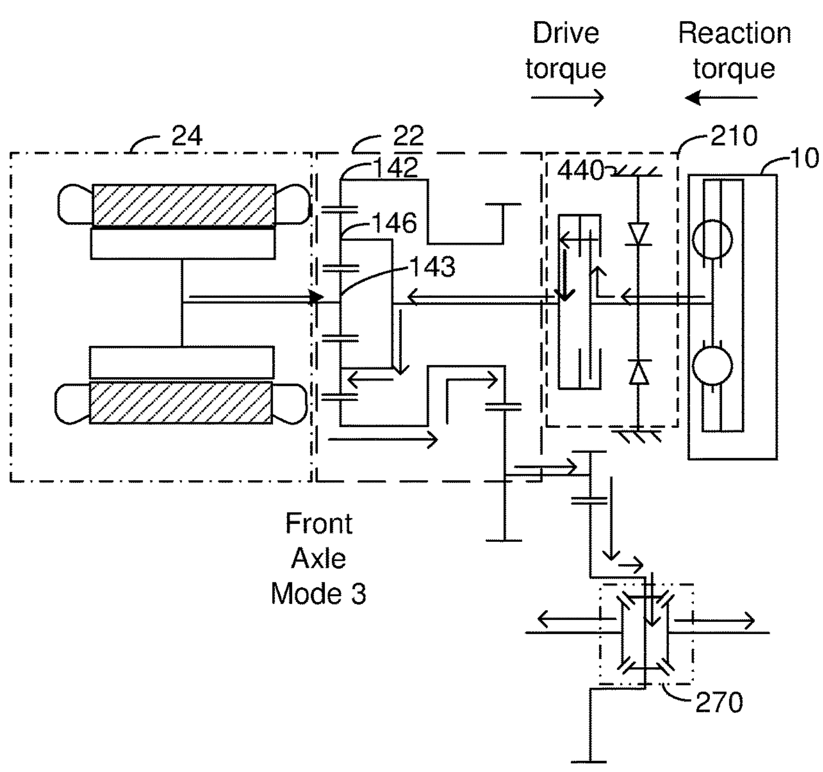
Figure 5:
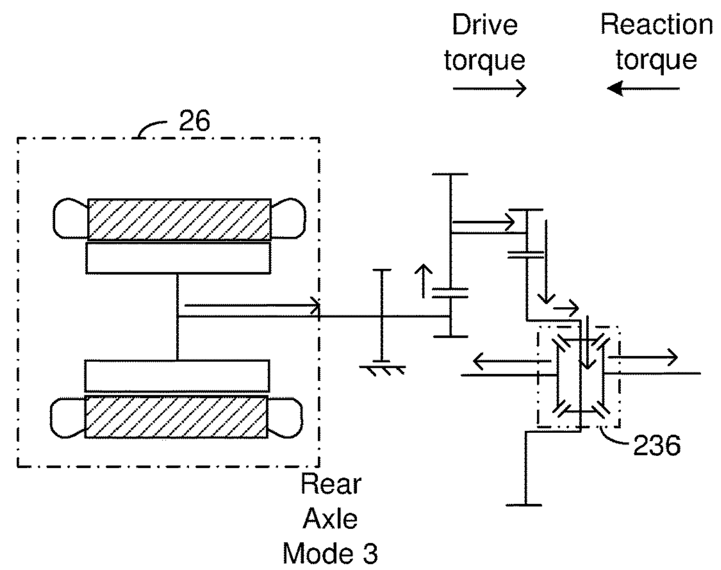
Figure 6:
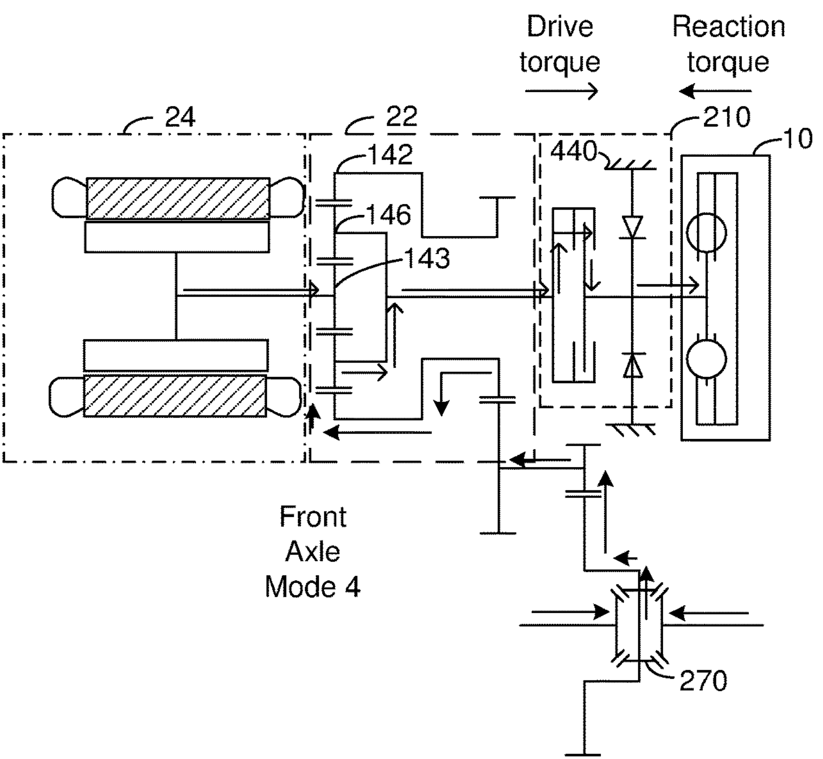
Figure 6:
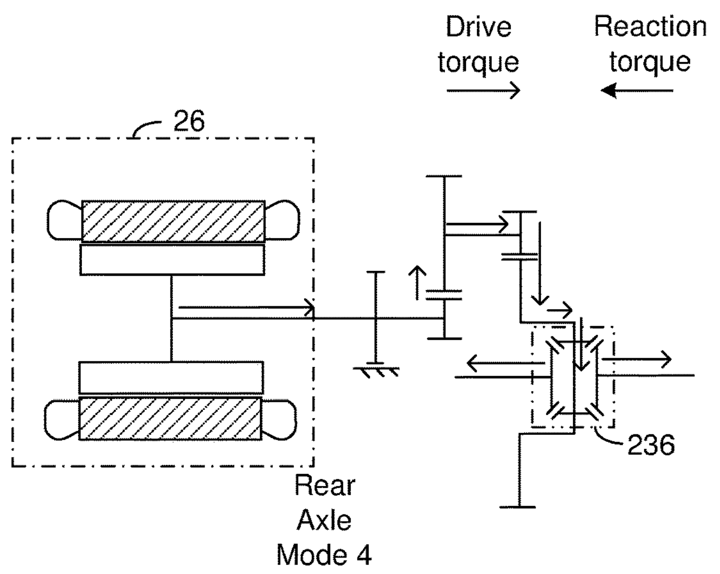

The following description relates to systems and methods for extending range of an electric vehicle. In one example, the electric vehicle may be a four wheel drive vehicle, though the present system also applies to two wheel drive vehicles. The vehicle may be referred to as a hybrid vehicle, but it may operate as an electric vehicle for extended periods of time due to the vehicle including a large capacity electric energy storage device (e.g., battery). The electric energy storage device may be recharged by power from an electric grid or the vehicle's internal combustion engine. The internal combustion engine may effectively extend the range of the vehicle beyond the range that may be provided solely via the electric energy storage device. The vehicle may include an internal combustion engine as shown in FIG. 1. The vehicle powertrain may be configured as shown in FIGS. 2 and 3. The vehicle may include at least four operating modes as shown in FIGS. 4-6. The vehicle may be operated according to the method of FIG. 7. An example two-way clutch is shown in FIG. 8.

An electrified vehicle including a powersplit transmission may drive an axle to propel the electrified vehicle. The powersplit transmission may include a first electric machine and a second electric machine, but only the second electric machine may be configured to provide mechanical torque to propel the electrified vehicle. Therefore, the vehicle may not be propelled via the first electric machine, which may reduce vehicle functionality. Further, as mentioned, the powersplit transmission is configured to drive a single axle, so vehicle tractive effort may be constrained or reduced during some operating conditions.

In one example, the above issue may be addressed by a vehicle system, comprising: a first axle; a transmission including a planetary gear set mechanically coupled to the first axle, the planetary gear set including a sun gear, a ring gear, and a planetary carrier assembly configured to support planetary pinion gears; an internal combustion engine; a two-way clutch positioned between the internal combustion engine and the planetary carrier; and a first electric machine coupled to the transmission.

By incorporating a two-way clutch into a powertrain between an internal combustion engine and a planetary carrier, it may be possible to provide the technical result of enhancing driveline functionality. Further, the two-way clutch may allow a vehicle to operate in electric drive mode with four wheel drive while traveling in a forward direction or a reverse direction. In particular, the two-way clutch may prevent the internal combustion engine from rotating while the vehicle is operated in electric drive mode with four wheel drive while traveling in a forward direction. Further, the two-way clutch may prevent the internal combustion engine from rotating while the vehicle is operated in electric drive mode four wheel drive while traveling in a reverse direction.

The approach described herein may have several advantages. In particular, the approach may provide increased vehicle functionality by allowing the vehicle to operate in four wheel drive modes in forward and reverse vehicle travel directions. Further, the approach may extend a driving range of an electrified vehicle by leveraging a chemical power source. In addition, the approach may be applied to four wheel drive vehicles and two wheel drive vehicles.

Referring to FIG. 1, an internal combustion engine 10 is shown. Engine 10 may be included in a drivetrain of a vehicle 100 configured for on-road propulsion, such as the powertrain of FIG. 2 or FIG. 3. In one example, vehicle 100 is a hybrid electric vehicle.

Engine 10 comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. An optional starter 96 (e.g., low voltage (operated with less than 30 volts) electric machine) is included for cranking the engine during an engine start. The starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain to initiate engine rotation during an engine start. Once a threshold engine speed is reached, the starter may be decoupled from the engine and thereafter engine rotation is maintained via fuel combustion in engine cylinders. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electromechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures. In further embodiments, fuel may be delivered into an intake port of cylinder 30, upstream of intake valve 52, to provide port injection of fuel. In still further embodiments, a portion of cylinder fuel may be delivered via direct injection while a remaining portion is delivered via port injection. The different injectors may deliver the same fuel or fuel of different properties, such as a gasoline fuel and an ethanol fuel.

Intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve (CRV) 47 may be selectively adjusted to a plurality of positions between fully open and fully closed. Adjusting the opening of CRV 47 allows boosted intake air to be selectively recirculated to upstream of the compressor so as to decrease the pressure in boost chamber 45. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an propulsive effort pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from an engine position sensor 118 sensing crankshaft 40 position; a measurement of air mass entering the engine from sensor 120; and a measurement of throttle position from sensor 68. The propulsive effort pedal and brake pedal may be combined for example in a pivoting setup to select either increasing vehicle speed or decreasing vehicle speed. Further, the propulsive effort pedal may be combined with the transmission direction selection for example, joystick control. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive operator input via a transmission lever or shift selector 136. Shift selector 136 may be manually shifted between different gear options by the vehicle operator based on a desired transmission output and a desired direction of vehicle motion. In one example, as depicted, the operator may have the following operator selectable options: park (P), reverse (R), neutral (N), and drive (D). In the depicted example, the shift selector is known as a PRNDL lever, corresponding to the different options. In one example, when in park or neutral, substantially no torque may be transmitted from the engine or an electric machine to the transmission output. When in park, the vehicle is immobile. In drive, an electronic controller can control the transmission to propel the vehicle in a forward direction. In reverse, a single the controller enables the vehicle to move in a backward or reverse direction. Shift selector 136 may be located on a steering column or between driver and passenger seats of the vehicle. In addition, the transmission may be configures as shown in more detail in FIGS. 2 and 3.

The controller 12 receives signals from the various sensors of FIG. 1 and employs the various actuators of FIG. 1, such as throttle 62, fuel injector 66, spark plug 92, etc., to adjust engine operation based on the received signals and instructions stored on a memory of the controller. As one example, the controller may send a pulse width signal to the fuel injector to adjust an amount of fuel delivered to a cylinder. Further, controller 12 may receive input from a human operator or vehicle passenger via human/machine interface 195. Human/machine interface may be a touch screen, touch panel, key switch, or other known input device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 depicts a first example propulsion system 200 for vehicle 100. In the depicted embodiment, the vehicle is a hybrid electric vehicle (HEV). Propulsion system 200 includes an internal combustion engine 10 (such as engine 10 of FIG. 1) having a plurality of cylinders 30. Fuel may be provided to each cylinder of engine 10 from a fuel system (not shown) including one or more fuel tanks, one or more fuel pumps, and injectors 66. Front 202 leads vehicle 100 when vehicle 100 moves in a forward direction 203. Rear 204 leads vehicle 100 when vehicle 100 moves in a reverse direction 205.

Engine 10 delivers power to transmission 157 via torque input shaft 18. In the depicted example, transmission 157 is a power-split transmission (or transaxle) that includes a two-way clutch 210, a planetary gear set 22 and one or more rotating gear elements. Transmission 157 further includes a first electric machine 24 (EM1) and a second electric machine 26 (EM2). The first electric machine 24 and the second electric machine 26 may operate as either a motor or a generator. Torque is output from transmission 157, for propelling vehicle tractions wheels 155, via a power transfer gearing 34, a torque output shaft 19, and an axle 288. Axle 288 is shown as a rear axle, but in some examples it may be a front axle. Axle 288 may include a differential assembly 236, right half shaft 287, and left half shaft 289.

First electric machine 24 is drivably connected to second electric machine 26 such that each of first electric machine 24 and second electric machine 26 may be operated using electric energy from an electrical energy storage device, herein depicted as battery 158. In some embodiments, an energy conversion device, such as an inverter, may be coupled between the battery and the motor to convert the DC output of the battery into an AC output for use by an electric machine. However, in alternate embodiments, the inverter may be configured in the electric machine. Due to the mechanical properties of the planetary gear set, first electric machine 24 may be driven by a power output element (on an output side) of the planetary gear set 22 via mechanical connection 232, as further elaborated below.

Second electric machine 26 may be operated in a regenerative mode, that is, as a generator, to absorb energy from vehicle motion and/or the engine and convert the absorbed kinetic energy to an energy form suitable for storage in battery 158. Furthermore, second electric machine 26 may be operated as a motor or generator, as required, to augment or absorb torque provided by the engine, such as during a transition of engine 10 between different combustion modes (e.g., during transitions between a spark ignition mode and a compression ignition mode).

Planetary gear set 22 comprises a ring gear 142, a sun gear 143, and a planetary carrier assembly 146. The ring gear and sun gear may be coupled to each other via the carrier assembly 146. The carrier assembly 146 may include planet pinion gears 147 and a carrier to support the planet pinion gears. The carrier assembly 146 is directly coupled to two-way clutch 210 and engine 10 without an intervening sun gear or ring gear. The sun gear 143 is directly coupled to the first electric machine 24 without intervening carrier assembly 146 or ring gear 142. Ring gear 142 is directly coupled to power transfer gearing 34, and transfer gearing 34 is coupled to vehicle traction wheels 155. The power transfer gearing 34 may include one or more meshing gear elements 260-268. Second electric machine 26 may drive gear elements 270, which acts as a torque input for the gear elements 260-268. In this way, the ring gear 142 (and consequently the engine and first electric machine) may be coupled to the vehicle wheels and the motor via one or more gear elements. An operator may select a transmission mode via actuation of shift selector 136, as discussed at FIG. 1.

Controller 12 may command and control first electric machine 24 and second electric machine 26 as well as engine 10, battery 158, and brakes 202. In some examples, controller 12 may be embodied as two or more controllers. Controller 12 may be configured to receive information from a plurality of sensors 16 (various examples of which are described herein) and sending control signals to a plurality of actuators 81 (various examples of which are described herein). As one example, sensors 16 may include various pressure and temperature sensors, a fuel level sensor, various exhaust gas sensors, etc. Input may also be received via the shift selector 136, a brake pedal, a propulsive effort pedal, a vehicle speed sensor, and the other sensors of FIG. 1. The various actuators may include, for example, the gear set, cylinder fuel injectors (not shown), an air intake throttle coupled to the engine intake manifold (not shown), and the actuators of FIG. 1. Controller 12 may receive input data from the various sensors, process the input data, and trigger the actuators in response to the processed input data based on instruction or code programmed therein corresponding to one or more control routines.

For example, a frictional force may be applied to wheels 155 by engaging friction wheel brakes 202. In one example, friction wheel brakes 202 may be engaged in response to the driver pressing their foot on a brake pedal (not shown). A brake control module of the controller 12 may adjust the brake torque applied to the wheels via the wheel brakes in concert with an engine brake torque from engine 10 and/or a motor brake torque from second electric machine 26 in order to apply a net amount of brake torque on the wheels that slow the vehicle's forward motion at a target rate of vehicle speed reduction. In the same way, the frictional force may be reduced to wheels 155 by disengaging wheel brakes 202 in response to the driver releasing their foot from a brake pedal, or the vehicle forward speed falling below a threshold.

Vehicle 100 may be operated in at least four different operating modes. The four operating modes include a forward electric vehicle mode, a reverse electric vehicle mode, a range extending forward mode, and an engine cranking mode. In these four modes, the vehicle 100 may be driven by only the engine 10, the engine 10 and the first and/or second electric machines cooperatively, or only the electric machines, or a combination.

For example, the vehicle may be driven in a first forward electric vehicle mode, wherein engine 10 is not rotated and either or both of the first electric machine 24 and second electric machine 26 provide propulsive effort to drive vehicle 100 in a forward direction. In the forward electric vehicle mode, the two-way clutch is operated in a first position or state that engages a tooth of a shaft, gear, or other device in a first direction and prevents the engine from rotating by an electric machine while the first electric machine 24 provides propulsive effort to drive the vehicle in a forward direction. For example, the first electric machine is rotated in a counterclockwise and/or the second electric machine may be rotated in a clockwise direction to move the vehicle in a forward direction.

In a reverse electric vehicle mode, engine 10 is not rotated and either or both of the first electric machine 24 and the second electric machine 26 provide propulsive effort to propel vehicle 100 in a reverse direction. In the reverse electric vehicle mode, the two-way clutch is operated in a second position or state that engages a tooth of a shaft, gear, or other device in a second direction and prevents the engine from rotating by an electric machine while the first electric machine 24 provides propulsive effort to drive the vehicle in a reverse direction. For example, the first electric machine is rotated in a clockwise and/or the second electric machine may be rotated in a counter-clockwise direction to move the vehicle in a reverse direction.

In a range extending mode, engine 10 rotates and it provides torque to propulsion system 200 to propel vehicle 100, and/or charge battery 158, and/or transfer electric power from first electric machine 24 to second electric machine 26 or vice-versa. In particular, the two-way clutch is operating in a second state (e.g., disengaged) that allows engine 10 to rotate with carrier assembly 146. The rotating engine may provide torque to first electric machine 24, and first electric machine 24 may convert the torque into electric power for charging battery 158 and/or powering second electric machine 26. Additionally, engine 10 provides torque to vehicle wheels 155 to propel vehicle 100.

In engine cranking mode, the two-way clutch is operated in the second state (e.g., disengaged) and first electric machine rotates engine 10 while vehicle 100 remains stationary. The second electric machine holds ring gear 142 from rotating.

Turning now to FIG. 3, a second example propulsion system 300 for vehicle 100 is shown. Many of the elements that are labeled in FIG. 3 are the same elements that are shown in FIG. 2. Elements that are common between FIG. 2 and FIG. 3 are commonly labeled. For example, engine 10 shown in FIG. 2 is the same engine 10 that is shown in FIG. 3. Elements that are the same in FIG. 3 as in FIG. 2 operate as previously mentioned in the description of FIG. 2. Therefore, repeating how some of the described components operate may be omitted for the sake of brevity.

In this depicted embodiment, the vehicle is a hybrid electric vehicle (HEV). Propulsion system 300 includes an internal combustion engine 10 (such as engine 10 of FIG. 1) having a plurality of cylinders 30. Fuel may be provided to each cylinder of engine 10 from a fuel system (not shown) including one or more fuel tanks, one or more fuel pumps, and injectors 66. Front 202 leads vehicle 100 when vehicle 100 moves in a forward direction 203. Rear 204 leads vehicle 100 when vehicle 100 moves in a reverse direction 205.

Engine 10 delivers power to transmission 157 via torque input shaft 18. In the depicted example, transmission 157 is a power-split transmission (or transaxle) that includes a two-way clutch 210, a planetary gear set 22 and one or more rotating gear elements. Transmission 157 further includes a first electric machine 24, but not a second electric machine 26. Rather, second electric machine 26 is incorporated into second axle 288. Transmission 157 may deliver propulsive effort solely to first or front axle 250. Second electric machine may deliver propulsive effort solely to axle 288 (e.g., second or rear axle) to drive vehicle traction wheels 155. The first electric machine 24 and the second electric machine 26 may operate as either a motor or a generator. Thus, vehicle 100 may be configured as a four wheel drive vehicle. Torque is output from transmission 157, for propelling front vehicle tractions wheels 156, via front axle 250. Axle 250 may include a differential assembly 270, right half shaft 251, and left half shaft 252. Axle 288 may include a differential assembly 236, right half shaft 287, and left half shaft 289.

First electric machine 24 is electrically connected to second electric machine 26 such that each of first electric machine 24 may supply electric power to second electric machine 26 and vise-versa. Further, first electric machine 24 and second electric machine 26 may be operated using electric energy from an electrical energy storage device, herein depicted as battery 158. In some embodiments, an energy conversion device, such as an inverter, may be coupled between the battery and the motor to convert the DC output of the battery into an AC output for use by an electric machine. However, in alternate embodiments, the inverter may be configured in the electric machine. Due to the mechanical properties of the planetary gear set, first electric machine 24 may be driven by a power output element (on an output side) of the planetary gear set 22.

Second electric machine 26 may be operated in a regenerative mode, that is, as a generator, to absorb energy from vehicle motion and/or the engine and convert the absorbed kinetic energy to an energy form suitable for storage in battery 158. First electric machine 24 may also be operated in the regenerative mode. Furthermore, first electric machine 24 may be operated as a motor or generator, as required, to augment or absorb torque provided by the engine, such as during a transition of engine 10 between different combustion modes (e.g., during transitions between a spark ignition mode and a compression ignition mode).

In this example, transmission 157 outputs power from gear 262 to front axle 250 and front axle 250 is not coupled to rear axle 288. Front axle 250 may be driven independently from rear axle 288.

Controller 12 may command and control first electric machine 24 and second electric machine 26 as well as engine 10, battery 158, and brakes 201. In some examples, controller 12 may be embodied as two or more controllers.

Vehicle 100 may be operated in at least four different operating modes. The four operating modes include a forward four wheel drive electric vehicle mode, a reverse four wheel drive electric vehicle mode, a range extending forward four wheel drive mode, and an engine cranking mode. In these four modes, the vehicle 100 may be driven by only the engine 10, the engine 10 and the first and/or second electric machines cooperatively, or only the electric machines, or a combination.

For example, the vehicle may be driven in a first forward four wheel drive electric vehicle mode, wherein engine 10 is not rotated. The first electric machine 24 supplies propulsive effort to front axle 250 and the second electric machine 26 supplies propulsive effort to rear axle 288 to drive vehicle 100 in a forward direction. In the first forward four wheel drive electric vehicle mode, the two-way clutch is operated in a first position or state that engages a tooth of a shaft, gear, or other device in a first direction and prevents the engine from rotating by first electric machine 24 while the first electric machine provides propulsive effort to the front axle 250. At the same time, the second electric machine 26 provides propulsive effort to drive the rear axle 288. The vehicle may proceed in a forward direction. For example, the first electric machine is rotated in a counterclockwise direction and/or the second electric machine may be rotated in a clockwise direction to move the vehicle in a forward direction. Both axles are provided with propulsive effort (e.g., torque or power).

In a reverse four wheel drive electric vehicle mode, engine 10 is not rotated and first electric machine 24 provides propulsive effort to front axle 250. Second electric machine 26 provides propulsive effort to rear axle 288. The first and second electric machines are rotated in directions opposite to the directions that they rotate in the first forward four wheel drive electric vehicle mode. This allows the vehicle to travel in a reverse direction in four wheel drive mode. In the reverse four wheel drive electric vehicle mode, the two-way clutch is operated in a second position or state that engages a tooth of a shaft, gear, or other device in a second direction and prevents the engine from rotating by the first electric machine while the first electric machine 24 provides propulsive effort to front axle 250. At the same time, the second electric machine 26 provides propulsive effort to the rear axle 288. This drives the vehicle in a reverse direction. For example, the first electric machine is rotated in a clockwise direction and/or the second electric machine may be rotated in a counter-clockwise direction to move the vehicle in a reverse direction.

In a range extending mode, engine 10 rotates and it provides torque to propulsion system 300 to propel vehicle 100, and/or charge battery 158, and/or transfer electric power from first electric machine 24 to second electric machine 26. In particular, the two-way clutch is operating in a second state (e.g., disengaged) that allows engine 10 to rotate with carrier assembly 146. The rotating engine may provide torque to first electric machine 24, and first electric machine 24 may convert the torque into electric power for charging battery 158 and/or powering second electric machine 26. Additionally, engine 10 provides torque to vehicle wheels 156 via front axle 250 to propel vehicle 100 and second electric machine provides torque to vehicle wheels via rear axle 288.

In engine cranking mode, the two-way clutch is operated in the second state (e.g., disengaged) and first electric machine rotates engine 10 while vehicle 100 is held stationary by the second electric machine. The second electric machine may propel the vehicle while the engine is being cranked. Once the engine is started, the vehicle may enter the third mode.

Thus, the system of FIGS. 1-3 provides for a vehicle system, comprising: a first axle; a transmission including a planetary gear set mechanically coupled to the first axle, the planetary gear set including a sun gear, a ring gear, and a planetary carrier assembly configured to support planetary pinion gears; an internal combustion engine; a two-way clutch positioned between the internal combustion engine and the planetary carrier; and a first electric machine coupled to the transmission. In a first example, the vehicle system further comprises a second electric machine mechanically coupled to a second axle, the second axle different than the first axle. In a second example that may include the first example, the vehicle system further comprises a second electric machine mechanically coupled to the transmission. In a third example that may include one or both of the first and second examples, the vehicle system further comprises a controller including executable instructions stored in non-transitory memory that cause the controller to adjust an operating state of the two-way clutch. In a fourth example that may include one or more of the first through third examples, the vehicle system includes where adjusting the operating state of the two-way clutch includes adjusting the two-way clutch to a first state when the internal combustion engine is not operating and the first electric machine is providing torque to rotate vehicle wheels in a first direction. In a fifth example that may include one or more of the first through fourth examples, the vehicle system includes where adjusting the operating state of the two-way clutch includes adjusting the two-way clutch to a second state when the internal combustion engine is not operating and the first electric machine is providing torque to rotate vehicle wheels in a second direction, the second direction different than the first direction. In a sixth example that may include one or more of the first through fifth examples, the vehicle system includes where the first axle is a rear axle. In a seventh example that may include one or more of the first through sixth examples, the vehicle system includes where the first axle is a front axle.

The system of FIGS. 1-3 also provides for a vehicle system, comprising: a first axle; a transmission including a planetary gear set mechanically coupled to the first axle, the planetary gear set including a sun gear, a ring gear, and a planetary carrier assembly configured to support planetary pinion gears; an internal combustion engine; a two-way clutch positioned between the internal combustion engine and the planetary carrier; a first electric machine coupled to the transmission; and a controller including executable instructions stored in non-transitory memory that cause the controller to operate the vehicle system in four different operating modes including electric vehicle forward four wheel drive mode, electric vehicle reverse four wheel drive mode, engine cranking mode, and engine on mode. In a first example, the vehicle system includes where in electric vehicle forward four wheel drive mode, the first axle is driven via the first electric machine and a second axle are driven via a second electric machine. In a second example that may also include the first example, the vehicle system includes where in electric vehicle reverse four wheel drive mode, the first axle is driven via the first electric machine and a second axle are driven via a second electric machine. In a third example that may include one or both of the first and second examples, the vehicle system includes where the first electric machine rotates the internal combustion engine when the vehicle system is operated in the engine cranking mode. In a fourth example that may include one or more of the first through third examples, the vehicle system includes where the first electric machine provides electric power to a second electric machine and an electric energy storage device when the vehicle system is operated in the engine on mode.

Referring now to FIG. 4, a stick diagram that shows how drive torque and reaction torque flow through the various vehicle components when operating the vehicle in a forward or reverse four wheel drive electric vehicle mode. The drive torque flow and reaction torque flows are identified by the two different types of arrows which indicate a direction of torque flow. The top portion of FIG. 4 shows the front axle configuration while the rear portion of FIG. 4 shows the rear axle configuration.

First electric machine 24 is directly coupled to sun gear 143 of planetary gear set 22. Planetary carrier assembly 146 is directly coupled to two-way clutch 210. Ring gear 142 is coupled to front differential 270. Engine 10 is directly coupled to two-way clutch 210. In forward and reverse four wheel drive electric vehicle modes, the two-way clutch grounds planetary carrier assembly 146 to the transmission case 440 so that the engine does not turn while first electric machine 24 delivers torque to the vehicle's front wheels as indicated by the drive torque arrows.

At the same time, second electric machine 26 delivers torque to the vehicle's rear wheels as indicated by the drive torque arrows. Thus, the rear axle may be driven independently of the front axle in forward and reverse four wheel drive electric vehicle modes.

Moving on to FIG. 5, a stick diagram that shows how drive torque and reaction torque flow through the various vehicle components when operating the vehicle in a forward four wheel drive range extending mode. The drive torque flow and reaction torque flows are identified by the two different types of arrows which indicate a direction of torque flow. The top portion of FIG. 5 shows the front axle configuration while the rear portion of FIG. 5 shows the rear axle configuration.

First electric machine 24 is directly coupled to sun gear 143 of planetary gear set 22. Planetary carrier assembly 146 is directly coupled to two-way clutch 210. Ring gear 142 is coupled to front differential 270. Engine 10 is directly coupled to two-way clutch 210. In forward four wheel drive range extending mode, the two-way clutch is open so that it allows engine 10 to rotate. First electric machine 24 may consume torque from engine 10 and convert it to electric power for charging battery 158 or operating second electric machine 26. Engine 10 delivers torque to planetary carrier assembly 146, which in turn relays the torque to sun gear 143 and ring gear 142. Ring gear 142 may rotate front differential 270.

At the same time, second electric machine 26 delivers torque to the vehicle's rear wheels as indicated by the drive torque arrows. Thus, the rear axle may be driven independently of the front axle in forward four wheel drive range extending mode.

Referring now to FIG. 6, a stick diagram that shows how drive torque and reaction torque flow through the various vehicle components when operating the vehicle in a forward engine cranking mode. The drive torque flow and reaction torque flows are identified by the two different types of arrows which indicate a direction of torque flow. The top portion of FIG. 6 shows the front axle configuration while the rear portion of FIG. 6 shows the rear axle configuration.

First electric machine 24 is directly coupled to sun gear 143 of planetary gear set 22. Planetary carrier assembly 146 is directly coupled to two-way clutch 210. Ring gear 142 is coupled to front differential 270. Engine 10 is directly coupled to two-way clutch 210. In forward engine cranking mode, the two-way clutch is open so that it allows engine 10 to rotate under power from first electric machine 24. First electric machine 24 may rotate engine 10 to assist starting of engine 10. Ring gear 142 may rotate with front differential 270 or remain stationary if vehicle 100 is not moving.

At the same time, second electric machine 26 may deliver torque to the vehicle's rear wheels as indicated by the drive torque arrows. Thus, the rear axle may be driven independently of the front axle in forward engine cranking mode.

Figure 7:
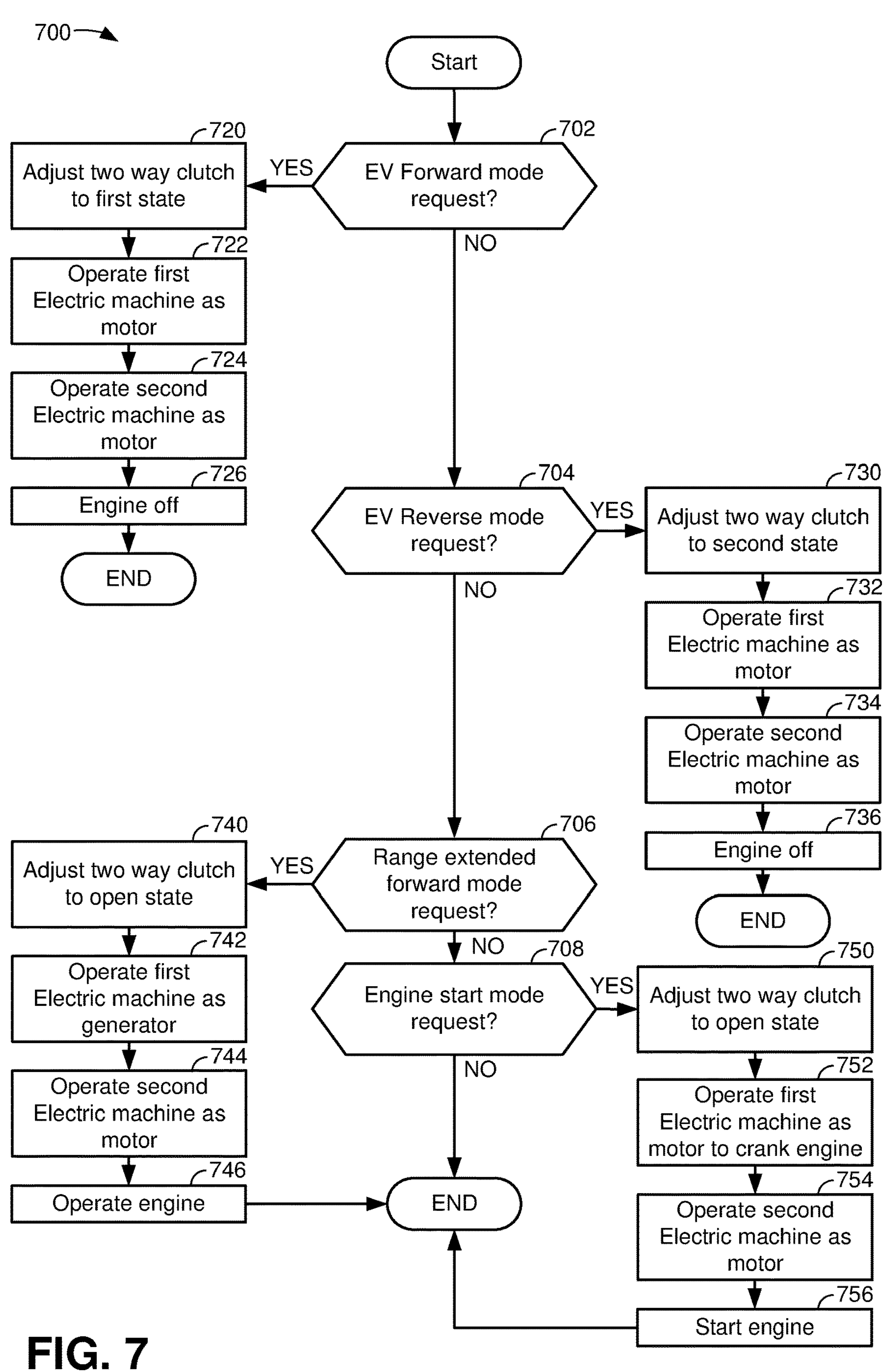
FIG. 7 shows a flowchart of an example method for operating the first and/or second vehicles.

Referring now to FIG. 7, a high level flowchart of an example method 700 for operating a vehicle is shown. The method of FIG. 7 may be incorporated into the system of FIGS. 1-3 as executable instructions stored in controller non-transitory memory. In addition, other portions of method 700 may be performed via a controller transforming operating states of devices and actuators in the physical world. The controller may employ engine actuators of the engine system to adjust engine operation.

At 702, method 700 judges whether or not forward four wheel drive electric vehicle mode has been requested. The vehicle operating mode may be requested via a user input or vehicle controller. If method 700 judges that forward four wheel drive electric vehicle mode has been requested, the answer is yes and method 700 proceeds to 720. Otherwise, the answer is no and method 700 proceeds to 704.

At 720, method 700 adjusts a position of a two-way clutch 210 to a first state (e.g., a first position). In the first state, the two-way clutch 210 allows no rotation of engine 10 and grounds the planet carrier to the transmission case when the planet carrier is attempted to be rotated in a first direction. However, if the planet carrier is rotated in a second direction the engine is allowed to rotate with the planet carrier. Method 700 proceeds to 722.

At 722, method 700 operates the first electric machine as a motor and provides propulsive effort to the vehicle's front axle. The amount of propulsive effort may be based on a position of a driver demand pedal. First electric machine is rotated in a way that propels the vehicle in a forward direction. Method 700 proceeds to 724.

At 724, method 700 operates the second electric machine as a motor and provides propulsive effort to the vehicle's rear axle. The amount of propulsive effort may be based on a position of a driver demand pedal. Second electric machine is rotated in a way that propels the vehicle in a forward direction. Method 700 proceeds to 726.

At 726, method 700 maintains the engine stopped (e.g., not rotating or combusting fuel). Method 700 proceeds to exit.

In this way, method 700 may operate the vehicle in a forward four wheel drive electric vehicle mode. The vehicle may travel in a forward direction with four wheel drive active in this mode. The two-way clutch allows the engine to remain stopped to improve vehicle efficiency.

At 704, method 700 judges whether or not reverse four wheel drive electric vehicle mode has been requested. The vehicle operating mode may be requested via a user input or vehicle controller. If method 700 judges that reverse four wheel drive electric vehicle mode has been requested, the answer is yes and method 700 proceeds to 730. Otherwise, the answer is no and method 700 proceeds to 706.

At 730, method 700 adjusts a position of a two-way clutch 210 to a second state (e.g., a second position. In the second state, the two-way clutch 210 allows no rotation of engine 10 and grounds the planet carrier to the transmission case when the planet carrier is attempted to be rotated in a second direction, opposite of the first direction (e.g., clockwise v. counter-clockwise). However, if the planet carrier is rotated in the first direction the engine is allowed to rotate with the planet carrier. Method 700 proceeds to 732.

At 732, method 700 operates the first electric machine as a motor and provides propulsive effort to the vehicle's front axle. The amount of propulsive effort may be based on a position of a driver demand pedal. First electric machine is rotated in a way that propels the vehicle in a reverse direction. Method 700 proceeds to 734.

At 734, method 700 operates the second electric machine as a motor and provides propulsive effort to the vehicle's rear axle. The amount of propulsive effort may be based on a position of a driver demand pedal. Second electric machine is rotated in a way that propels the vehicle in a reverse direction. Method 700 proceeds to 736.

At 736, method 700 maintains the engine stopped (e.g., not rotating or combusting fuel). Method 700 proceeds to exit.

In this way, method 700 may operate the vehicle in a reverse four wheel drive electric vehicle mode. The vehicle may travel in a reverse direction with four wheel drive active in this mode. The two-way clutch allows the engine to remain stopped to improve vehicle efficiency.

At 706, method 700 judges whether or not range extended four wheel drive vehicle mode has been requested. The vehicle operating mode may be requested via a user input or vehicle controller. If method 700 judges that range extended four wheel drive mode has been requested, the answer is yes and method 700 proceeds to 740. Otherwise, the answer is no and method 700 proceeds to 708.

At 740, method 700 adjusts a position of a two-way clutch 210 to an open state (e.g., a third position). In the open state, the two-way clutch 210 allows rotation of engine 10 via the planetary carrier assembly 146. Method 700 proceeds to 742.

At 742, method 700 operates the first electric machine as a generator and provides electric power to the battery and/or the second electric machine. The first electric machine is rotated via the engine. Method 700 proceeds to 744.

At 744, method 700 operates the second electric machine as a motor and provides propulsive effort to the vehicle's rear axle. The amount of propulsive effort may be based on a position of a driver demand pedal. Second electric machine is rotated in a way that propels the vehicle in a forward direction. Method 700 proceeds to 746.

At 746, method 700 operates the engine and the engine produces torque which may be routed to vehicle wheels and/or the first electric machine. Method 700 proceeds to exit.

In this way, method 700 may operate the vehicle in a forward four wheel drive range extended mode. The vehicle may travel further in this mode because chemical energy may be applied to propel the vehicle along with electric energy.

At 708, method 700 judges whether or not engine start mode has been requested. The vehicle operating mode may be requested via a user input or vehicle controller. If method 700 judges that engine starting mode has been requested, the answer is yes and method 700 proceeds to 750. Otherwise, the answer is no and method 700 proceeds to exit.

At 750, method 700 adjusts a position of a two-way clutch 210 to an open state (e.g., a third position). In the open state, the two-way clutch 210 allows rotation of engine 10 via the planetary carrier assembly 146. Method 700 proceeds to 752.

At 752, method 700 operates the first electric machine as a motor and rotates the engine to assist engine starting. Method 700 proceeds to 754.

At 754, method 700 operates the second electric machine as a motor and provides propulsive effort to the vehicle's rear axle. The amount of propulsive effort may be based on a position of a driver demand pedal. Second electric machine is rotated in a way that propels the vehicle in a forward direction. Method 700 proceeds to 756.

At 756, method 700 starts the engine by providing spark and fuel to the engine. The engine produces torque which may be routed to vehicle wheels and/or the first electric machine after the engine is started. Method 700 proceeds to exit.

In this way, method 700 may operate the vehicle in a forward engine cranking mode. The vehicle may travel or be stationary while the engine is being cranked.

The method of FIG. 7 may provide for a method for operating a vehicle, comprising: adjusting an operating state of a two-way clutch in response to a position of a shifter, the two-way clutch positioned between a planetary carrier assembly and an internal combustion engine. In a first example, the method includes, wherein adjusting the operating state of the two-way clutch includes adjusting the two-way clutch to a first position in response to the shifter being in a forward position. In a second example that may include the first example, the method includes wherein adjusting the operating state of the two-way clutch includes adjusting the two-way clutch to a second position in response to the shifter being in a reverse position. In a third example that may include one or both of the first and second examples, the method further comprises operating the vehicle in a first mode where a first electric machine propels the vehicle when the shifter is in a reverse position. In a fourth example that may include one or more of the first through third examples, the method further comprises operating the vehicle in a second mode where a first electric machine propels the vehicle when the shifter is in a drive position. In a fifth example that may include one or more of the first through fourth examples, the method further comprises operating the vehicle in a third mode where the two-way clutch is open and the first electric machine generates electric power from energy provided via an internal combustion engine. In a sixth example that may include one or more of the first through fifth examples, the method further comprises operating the vehicle in a fourth mode where the two-way clutch is open and the first electric machine rotates the internal combustion engine.

In another representation, the method of FIG. 7 provides for a method for operating a vehicle, comprising: adjusting an operating state of a two-way clutch in response to a position of a shifter, the two-way clutch positioned between a planetary carrier assembly and an internal combustion engine, wherein the two-way clutch is adjusted to an open position to allow an electric machine to crank the internal combustion engine in response to an engine start request. The method further includes operating the internal combustion engine when the two-way clutch is open and generating electric power from output of the engine.

Figure 8A:
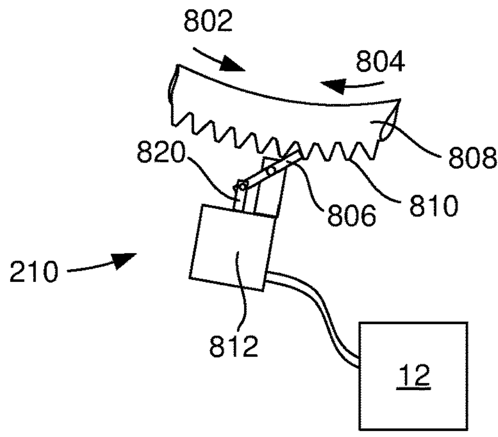
FIG. 8A-C shows an example two-way clutch.
Figure 8B:
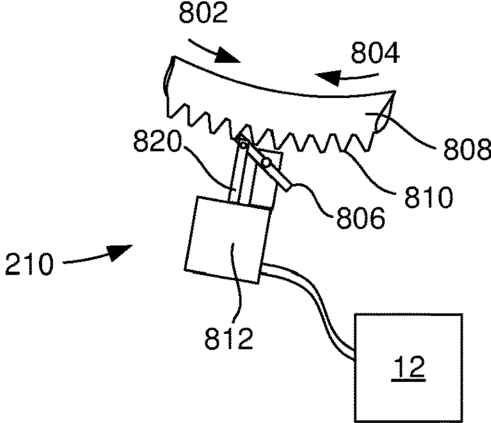
Figure 8C:
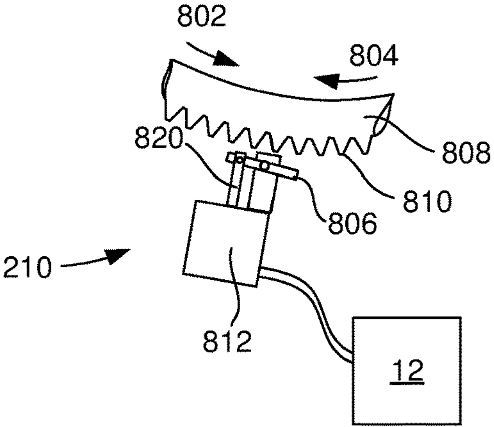

Referring now to FIGS. 8A-8C, FIG. 8A shows an example two-way clutch 210 in a first position that prevents engine 10 from rotating in a first direction 804 (e.g., clockwise). FIG. 8B shows the example two-way clutch 210 in a second position that prevents engine 10 from rotating in a second direction 802 (e.g., counter-clockwise). FIG. 8C shows the example two-way clutch 210 in a third position that allows engine 10 to rotate clockwise or counter-clockwise.

Two-way clutch 210 includes an actuator 812 (e.g., a solenoid) that extends and retracts shaft 820 to position a pawl 806. Pawl 806 may engage teeth 810 to limit a direction that planetary carrier frame 808 may rotate. Alternatively, pawl 809 may selectively engage teeth of a shaft, sprocket, or other device to allow or prevent relative motion between planetary gear set components.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle system, comprising:

a first axle;

a transmission including a planetary gear set mechanically coupled to the first axle, the planetary gear set including a sun gear, a ring gear, and a planetary carrier assembly configured to support planetary pinion gears;

an internal combustion engine;

a two-way clutch positioned between the internal combustion engine and the planetary carrier assembly; and a first electric machine coupled to the transmission, wherein the two-way clutch is configured to selectively ground the planetary carrier assembly to a transmission case to prevent rotation of the internal combustion engine based on a direction of attempted rotation of the planetary carrier assembly.

2. The vehicle system of claim 1, further comprising a second electric machine mechanically coupled to a second axle, the second axle different than the first axle.

3. The vehicle system of claim 1, further comprising a second electric machine mechanically coupled to the transmission.

4. The vehicle system of claim 1, further comprising a controller including executable instructions stored in non-transitory memory that cause the controller to adjust an operating state of the two-way clutch.

5. The vehicle system of claim 4, where adjusting the operating state of the two-way clutch includes adjusting the two-way clutch to a first state when the internal combustion engine is not operating and the first electric machine is providing torque to rotate vehicle wheels in a first direction.

6. The vehicle system of claim 5, where adjusting the operating state of the two-way clutch includes adjusting the two-way clutch to a second state when the internal combustion engine is not operating and the first electric machine is providing torque to rotate vehicle wheels in a second direction, the second direction different than the first direction.

7. The vehicle system of claim 1, where the first axle is a rear axle.

8. The vehicle system of claim 1, where the first axle is a front axle.

9. A method for operating a vehicle, the vehicle comprising:

a first axle;

a transmission including a planetary gear set mechanically coupled to the first axle, the planetary gear set including a sun gear, a ring gear, and a planetary carrier assembly configured to support planetary pinion gears;

an internal combustion engine;

a two-way clutch positioned between the internal combustion engine and the planetary carrier assembly; and a first electric machine coupled to the transmission, wherein the two-way clutch is configured to selectively ground the planetary carrier assembly to a transmission case to prevent rotation of the internal combustion engine based on a direction of attempted rotation of the planetary carrier assembly;

the method comprising:

adjusting an operating state of the two-way clutch in response to a position of a shifter.

10. The method of claim 9, wherein adjusting the operating state of the two-way clutch includes adjusting the two-way clutch to a first position in response to the shifter being in a forward position.

11. The method of claim 10, wherein adjusting the operating state of the two-way clutch includes adjusting the two-way clutch to a second position in response to the shifter being in a reverse position.

12. The method of claim 9, further comprising operating the vehicle in a first mode where a first electric machine propels the vehicle when the shifter is in a reverse position.

13. The method of claim 12, further comprising operating the vehicle in a second mode where the first electric machine propels the vehicle when the shifter is in a drive position.

14. The method of claim 13, further comprising operating the vehicle in a third mode where the two-way clutch is open and the first electric machine generates electric power from energy provided via the internal combustion engine.

15. The method of claim 14, further comprising operating the vehicle in a fourth mode where the two-way clutch is open and the first electric machine rotates the internal combustion engine.

16. A vehicle system, comprising:

a first axle;

a transmission including a planetary gear set mechanically coupled to the first axle, the planetary gear set including a sun gear, a ring gear, and a planetary carrier assembly configured to support planetary pinion gears;

an internal combustion engine;

a two-way clutch positioned between the internal combustion engine and the planetary carrier assembly;

a first electric machine coupled to the transmission; and a controller including executable instructions stored in non-transitory memory that cause the controller to:

operate the vehicle system in four different operating modes including electric vehicle forward four wheel drive mode, electric vehicle reverse four wheel drive mode, engine cranking mode, and engine on mode, and selectively operate the two-way clutch to ground the planetary carrier assembly to a transmission case to prevent rotation of the internal combustion engine based on a direction of attempted rotation of the planetary carrier assembly.

17. The vehicle system of claim 16, where in electric vehicle forward four wheel drive mode, the first axle is driven via the first electric machine and a second axle are driven via a second electric machine.

18. The vehicle system of claim 16, where in electric vehicle reverse four wheel drive mode, the first axle is driven via the first electric machine and a second axle are driven via a second electric machine.

19. The vehicle system of claim 16, where the first electric machine rotates the internal combustion engine when the vehicle system is operated in the engine cranking mode.

20. The vehicle system of claim 16, where the first electric machine provides electric power to a second electric machine and an electric energy storage device when the vehicle system is operated in the engine on mode.

* * * * *